(12) United States Patent
Haas et al.

(10) Patent No.: US 11,716,111 B2
(45) Date of Patent: Aug. 1, 2023

(54) COMMUNICATION SYSTEM AND METHOD

(71) Applicant: Westinghouse Air Brake Technologies Corporation, Pittsburgh, PA (US)

(72) Inventors: Carl L. Haas, Walkersville, MD (US); Padam D. Swar, Clarksburg, MD (US)

(73) Assignee: WESTINGHOUSE AIR BRAKE TECHNOLOGIES CORPORATION, Pittsburgh, IA (US)

( * ) Notice: Subject to any disclaimer, the term of this patent is extended or adjusted under 35 U.S.C. 154(b) by 0 days.

(21) Appl. No.: 17/313,888

(22) Filed: May 6, 2021

(65) Prior Publication Data

US 2022/0360287 A1 Nov. 10, 2022

(51) Int. Cl.
*G06V 40/10* (2022.01)
*G06K 7/10* (2006.01)
*G06F 1/32* (2019.01)
*H04B 1/3822* (2015.01)
*H01Q 1/48* (2006.01)
*H01Q 1/32* (2006.01)

(52) U.S. Cl.
CPC ......... *H04B 1/3822* (2013.01); *H01Q 1/3216* (2013.01); *H01Q 1/48* (2013.01)

(58) Field of Classification Search
CPC ....... H04B 1/3822; H01Q 1/3216; H01Q 1/48
USPC .......................................................... 340/3.1
See application file for complete search history.

(56) References Cited

U.S. PATENT DOCUMENTS

| | | | |
|---|---|---|---|
| 5,267,473 A | 12/1993 | Bezos et al. | |
| 5,650,713 A | 7/1997 | Takeuchi et al. | |
| 6,227,625 B1 | 5/2001 | Gaughan | |
| 6,803,748 B2 | 10/2004 | Peter | |
| 7,109,928 B1 * | 9/2006 | Thiele | H01Q 13/20 343/700 MS |
| 7,468,564 B2 | 12/2008 | Crisafulli | |
| 7,769,509 B2 | 8/2010 | Gaughan et al. | |
| 7,979,173 B2 | 7/2011 | Breed | |
| 8,102,077 B2 | 1/2012 | Neher | |
| 8,299,645 B2 | 10/2012 | Muchow et al. | |

(Continued)

FOREIGN PATENT DOCUMENTS

| | | |
|---|---|---|
| CA | 2972412 A1 | 8/2016 |
| CN | 101170279 A | 4/2008 |

(Continued)

OTHER PUBLICATIONS

Search Report dated Jun. 22, 2022 for corresponding Indian Application No. 202114014004 (6 pages).

(Continued)

*Primary Examiner* — Tanmay K Shah
(74) *Attorney, Agent, or Firm* — The Small Patent Law Group LLC; Mary D. Lawlor

(57) ABSTRACT

A system includes a housing operably coupled with a vehicle system, and a vehicle monitoring system disposed within the housing comprising a wireless communication device including an antenna configured to wirelessly communication data signals. One or more ground radials are electrically coupled with the wireless communication device and conduct the data signals from the wireless communication device. The one or more ground radials form a ground plane of the antenna while the vehicle system is moving and the antenna is wirelessly communicating the data signals.

20 Claims, 2 Drawing Sheets

(56) References Cited

U.S. PATENT DOCUMENTS

| | | |
|---|---|---|
| 9,065,370 B2 | 6/2015 | Ito et al. |
| 9,083,861 B2 | 7/2015 | Haas et al. |
| 9,393,977 B2 | 7/2016 | Kramer et al. |
| 10,457,281 B2 | 10/2019 | Brooks et al. |
| 2003/0071467 A1 | 4/2003 | Calley et al. |
| 2010/0123314 A1 | 5/2010 | Menke |
| 2012/0191265 A1 | 7/2012 | Keir |
| 2014/0361540 A1 | 12/2014 | Knight |
| 2015/0105967 A1 | 4/2015 | Skipp et al. |
| 2016/0118786 A1 | 4/2016 | Zhu et al. |
| 2016/0208781 A1 | 7/2016 | Kjær et al. |
| 2016/0290318 A1 | 10/2016 | Muik |
| 2017/0101054 A1 | 4/2017 | Dusane |
| 2018/0041151 A1 | 2/2018 | Turpin |
| 2018/0166776 A1* | 6/2018 | Ziegler ............... H01Q 1/52 |
| 2018/0210439 A1 | 7/2018 | Brooks et al. |
| 2020/0001857 A1 | 1/2020 | Naylor et al. |
| 2022/0059935 A1* | 2/2022 | Zhang ............... H01Q 9/0457 |

FOREIGN PATENT DOCUMENTS

| | | |
|---|---|---|
| CN | 103078615 A | 5/2013 |
| WO | 2019133824 A1 | 7/2019 |

OTHER PUBLICATIONS

Analog Devices LTC3350, High Current Supercapacitor Backup Controller and System Monitor (10 pages).

Burr-Brown, 1.2A PWM High-Side Driver for Solenoids, Coils, Valves, Heaters, and Lamps (26 pages).

Office Action for corresponding CA Application No. 3,113,624 dated Mar. 2, 2022 (4 pages).

Examination Report No. 1 for corresponding AU Application No. 2022201616 dated Mar. 9, 2022 (4 pages).

Examination Report No. 2 for corresponding AU Application No. 2022201616 dated May 29, 2023 (3 pages).

* cited by examiner

COMMUNICATION SYSTEM AND METHOD

BACKGROUND

Technical Field

The subject matter described relates to communication systems and methods.

Discussion of Art

Vehicle signaling and/or monitoring devices may be transferably coupled with vehicle systems, and may move with the vehicle system as the vehicle system moves along the route. The monitoring devices may monitor the vehicle systems and/or the routes along which the vehicle systems move. The devices may be transferrable and moved from one vehicle to another vehicle, from one vehicle system to a storage facility, from a storage facility to a maintenance facility, or the like.

One technical problem with existing monitoring devices is the limitation of the antenna performance of the vehicle signaling and monitoring device. When used with vehicle systems that include plural vehicles, the monitoring device may be coupled with the last vehicle of the vehicle system, and may not have a direct line of sight to a lead vehicle of the vehicle system. Optionally, naturally and/or man-made obstacles may stand between the monitoring device and the lead vehicle. Additionally, the size of the monitoring device limits the size of an antenna that may be used within the device. The monitoring device may need to communicate data signals with the lead vehicle, however data signals communicated by the antenna that fits within the monitoring device may be unable to reach the lead vehicle, or the quality of the data signals may be compromised.

BRIEF DESCRIPTION

In one or more embodiments, a system includes a housing operably coupled with a vehicle system, and a vehicle monitoring system disposed within the housing comprising a wireless communication device including an antenna configured to wirelessly communication data signals. One or more ground radials are electrically coupled with the wireless communication device and conduct the data signals from the wireless communication device. The one or more ground radials form a ground plane of the antenna while the vehicle system is moving and the antenna is wirelessly communicating the data signals.

In one or more embodiments, a system includes a housing comprising plural surfaces defining a cavity operably coupled with a vehicle system, and a vehicle monitoring device disposed within the cavity of the housing. The vehicle monitoring device includes a wireless communication device including an antenna configured to wirelessly communicate data signals with a controller disposed outside of the housing. One or more ground radials are disposed within the cavity of the housing, and each extend between a first end electrically coupled with the wireless communication device and a second end. The one or more ground radials conduct the data signals between the wireless communication device and the controller. The one or more ground radials form a ground plane of the antenna while the vehicle system is moving and the antenna is wirelessly communicating the data signals with the controller.

In one or more embodiments, a method includes wirelessly communicating data signals from an antenna of a wireless communication device of a vehicle monitoring device. The vehicle monitoring device is disposed within a housing operably coupled with a vehicle system. The wireless communication device wirelessly communicates data signals with a controller disposed outside of the housing. A ground plane of the antenna is formed with one or more ground radials electrically coupled with the wireless communication device. The one or more ground radials form the ground plane of the antenna while the vehicle system is moving and the antenna is wirelessly communicating the data signals.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
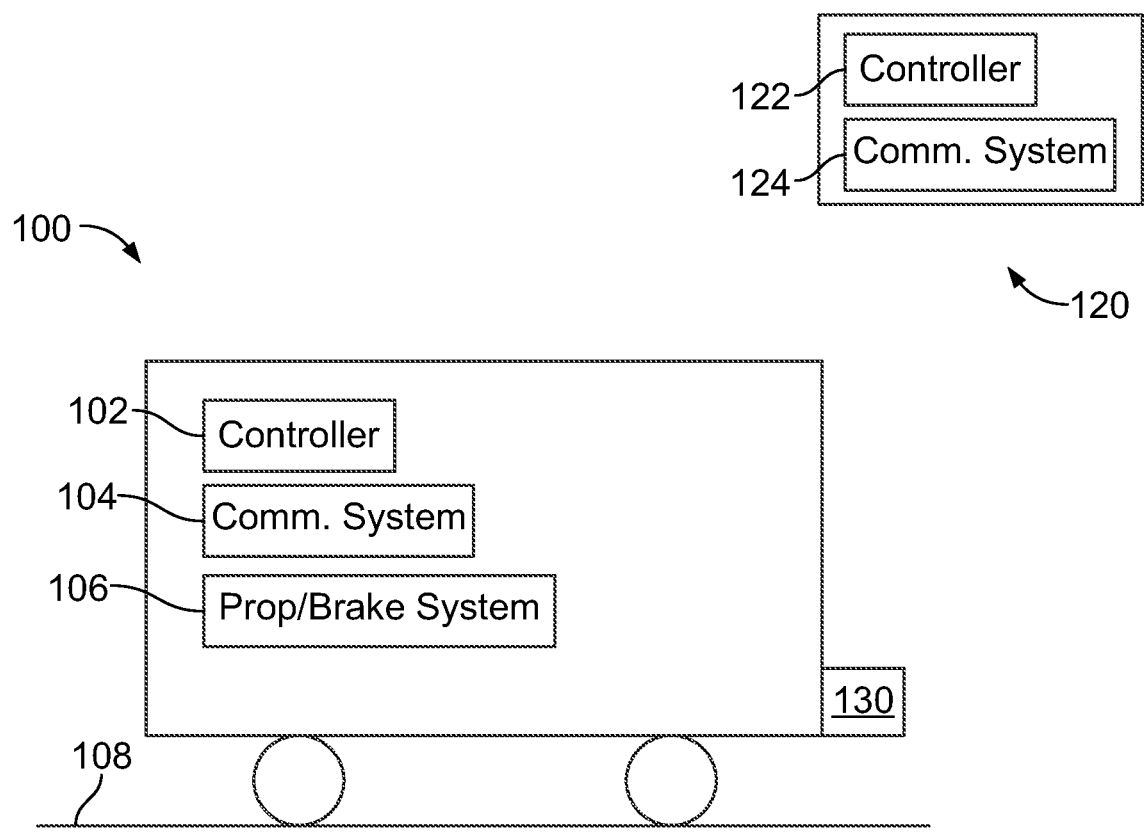
FIG. 1 schematically illustrates a vehicle system in accordance with one embodiment.

Embodiments of the subject matter described herein relate to systems and methods that change characteristics of data signals wirelessly communicated by a communication device of a system, such as an end-of-train (EOT) or end-of-vehicle (EOV) monitoring system. The EOV monitoring system may be transferably coupled with a vehicle system, and may monitor the vehicle system, the route along which the vehicle system moves, or the like. Alternatively, the communication device may be onboard the vehicle in another location, such as a head or leading end of the vehicle or another location. The system includes a housing with a vehicle monitoring device disposed within a cavity of the housing. Additionally or alternatively, the vehicle monitoring device may operate as a vehicle signaling device. The vehicle monitoring device includes a communication device that includes one or more of an antenna, a modem, or the like, that wirelessly communicate data signals. As one example, the communication device may include an antenna that may be an ultra-high frequency antenna, such that the communication device may be able to communicate within a frequency range of about 300 megahertz and about 3 gigahertz. Optionally, the communication device may be an alternative antenna or device that may be capable of communicating in different frequency ranges or at different discrete frequencies.

The wireless communication device is operably coupled with one or more ground radials or other ground radials that conduct data signals to and/or from the communication device. For example, the communication device may communicate with a controller onboard a vehicle system via a vehicle communication system, may communicate with a controller off-board the vehicle system via an off-board communication system, or the like. The ground radials may form a ground plane of the antenna, such as while the vehicle system is moving, while the antenna is wirelessly communicating the data signals, or the like. Optionally, the ground radials may change one or more characteristics of the data signals wirelessly communicated by the communication device. For example, first ends of the ground radials may be operably coupled with the communication device, and second ends of the ground radials may be disposed a distance away from the communication device and routed to different locations within the housing of the EOV system and/or locations outside of the housing of the EOV system.

In one or more embodiments, the ground radials may be flexible ground radials that may be able to be formed, bent, shaped, or the like, to allow the ground radials to be routed around different components within the housing of the EOV system. Optionally, one or more of the ground radials, or portions of the ground radials, may be rigid structures that may not be able to be bent, shaped, deformed, or the like. Optionally, a portion of one of the ground radials may extend within one of the walls or surfaces of the housing of the EOV system. Optionally, a portion of one of the ground radials may extend outside of the housing of the EOV system.

FIG. 1 illustrates a vehicle system 100 in accordance with one embodiment. The vehicle system can be a rail vehicle system, but optionally can be an automobile, a truck, a bus, a mining vehicle, a marine vessel, aircraft, agricultural equipment or vehicles, or other off-highway vehicle. While some embodiments described herein relate to vehicle systems, not all embodiments of the inventive subject matter are restricted to vehicle systems. One or more embodiments of the inventive subject matter may relate to other types or models of systems, such as mechanical systems, warehouse facilities, power grid components, mining and/or agricultural equipment, or the like. The illustrated vehicle system includes a single vehicle, but optionally can be formed from two or more vehicles that may travel together (by being mechanically coupled and/or by being mechanically separate but communicating with each other to travel together, such as in a convoy). The vehicle system travels along a route 108, such as tracks, roads, highways, land-based paths, airborne paths, waterways, or the like. Optionally, the vehicle system may include two or more different types of vehicles that may operate as a common vehicle system and that may communicate with each other via the off-board database. For example, the vehicle system may comprise a rail vehicle that may communicate with an unmanned aerial vehicle via the off-board database, or an aircraft that communicates with a marine vessel.

The vehicle system includes a controller 102, which may be referred to as an onboard controller. The onboard controller can represent hardware circuitry that includes and/or is connected with one or more processors that perform operations described in connection with the onboard controller. The onboard controller can communicate with onboard and/or off-board components via a vehicle communication system 104. The vehicle communication system can represent transceiving circuitry, one or more antennas, modems, or the like. In one or more embodiments, the vehicle communication system may receive and/or provide data signals to the onboard controller. The vehicle communication system may be the same or similar to other communication devices described herein.

The vehicle system includes a propulsion and brake system 106 that operates to control movement of the vehicle system along the route. The propulsion and brake system can represent one or more engines, motors, transmissions, propellers, or the like, that generate propulsion to move the vehicle system. The brake system can operate to slow or stop movement of the vehicle system. The brake system can include air brakes, friction brakes, motors (e.g., used for dynamic or regenerative braking), or the like. The onboard controller can communication control systems to the propulsion and brake system to control or change movement of the vehicle system.

In one or more embodiments, the vehicle system may include one or more energy storage devices (not shown) that store and/or generate electric current. This current can be used to power components onboard the vehicle system, such as the propulsion system, a lighting system, or the like. Optionally, the energy storage devices can include or represent one or more motors of the propulsion system and/or the brake system (e.g., where the motors generate current during regenerative braking). The energy storage devices can include one or more batteries, fuel cells, photovoltaic devices, flywheels, alternators, generators, or the like. The onboard controller can communicate control signals to the energy storage devices to control supply of the current to one or more components of the vehicle system.

The onboard controller of the vehicle system may communication with an off-board controller 122 of an off-board database 120. The off-board controller can represent hardware circuitry that includes and/or is connected with one or more processors that perform operations of the off-board controller. The off-board database may be disposed at a location along the route, or may be positioned a distance away from the route, such as a database facility. For example, the off-board database may be located such that the vehicle system may be visible to an operator of the off-board database. Alternatively, the off-board database may be disposed in a different county, in a different state, in a different country, or the like, as the vehicle system. In one or more embodiments, the off-board controller can communicate with the onboard controller of the vehicle system to control or restrict movement of the vehicle system. For example, the off-board controller can communicate with the onboard controller of the vehicle system to notify the vehicle system where the vehicle system is allowed to travel, how fast the vehicle system is allowed to travel, or the like.

In one embodiment, the off-board database may represent a back-office server of a positive vehicle control (PVC) system. A PVC system is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board database may represent another computerized system that communicates with vehicle systems described herein.

In one or more embodiments, a system 130 may be coupled with the vehicle system. The system may be referred to as an end-of-train (EOT) or end-of-vehicle (EOV) monitoring system. The EOV monitoring system may monitor the vehicle system and/or the route along which the vehicle system moves. In one or more embodiments, the vehicle system to which the monitoring system is coupled can be referred to as an end-of-train (EOT) vehicle or end-of-vehicle (EOV) vehicle. The EOT system may be a transferrable device that may be moved from one vehicle to another vehicle that may change the designation of the respective vehicle from which the EOT system is removed, and the other vehicle where the EOT system is moved to may be identified as a new EOT vehicle.

Figure 2:
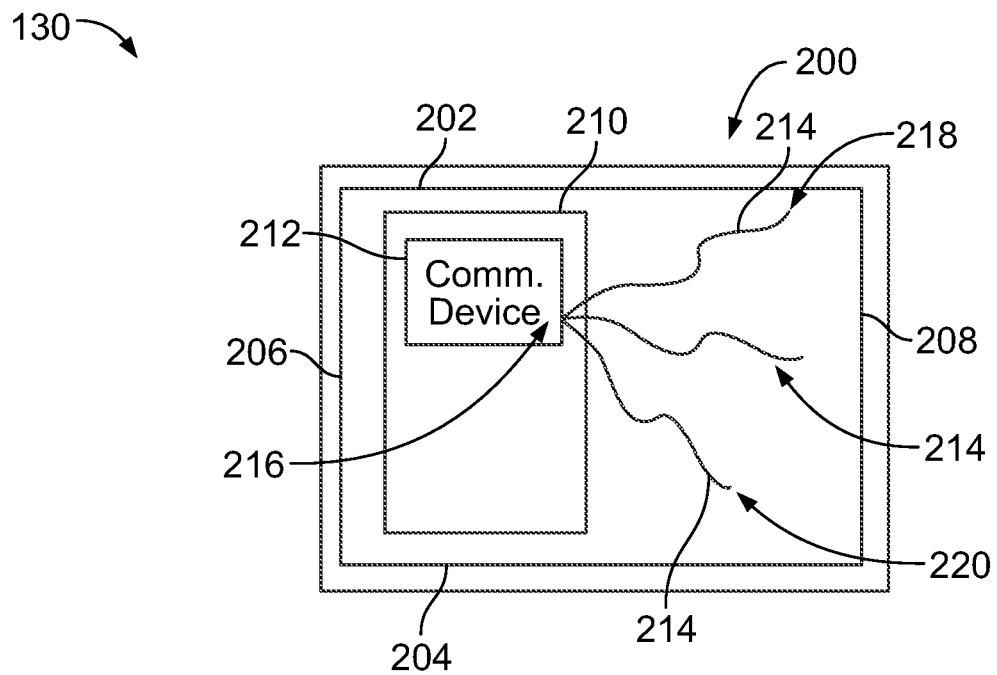
FIG. 2 illustrates a system of the vehicle system shown in FIG. 1 in accordance with one embodiment.

FIG. 2 illustrates the system 130 or the EOV system in accordance with one embodiment. The EOV system includes a housing 200 formed by plural surfaces, such as first, second, third, and fourth surfaces 202, 204, 206, 208, respectively, as illustrated in FIG. 2. The plural surfaces define an enclosure or cavity 220 such that the cavity is separated from the environment outside of the plural surfaces. One or more of the plural surfaces may be rigid surfaces and may be manufactured and designed to withstand rugged environments. For example, the surfaces may be manufactured of a metal or metallic alloy, a plastic, or other engineered material, such that the shape of the surfaces may remain substantially unchanged responsive to impact or compression forces directed onto the surfaces.

The EOV system includes a vehicle monitoring device 210 disposed within the cavity of the housing. The vehicle monitoring device includes a wireless communication device 212 that can represent and/or include transceiving circuitry, one or more antennas, modems, or the like. In one or more embodiments, the wireless communication device of the vehicle monitoring device may receive and/or provide data signals via the antenna to the onboard controller by wirelessly communicating with the vehicle communication system. Optionally, the antenna of the communication device may communicate data signals with the off-board communication system, directly or via the vehicle communication system.

In one or more embodiments, the vehicle system may include plural vehicles operably coupled together, and the EOV system may be coupled with the last vehicle of the vehicle system in the direction of travel of the vehicle system. For example, the EOV system may be positioned at a location out of a direct line of sight with a lead vehicle of the vehicle system. The antenna of the communication device may wirelessly communicate command signals with one or more of the vehicles of the vehicle system. For example, the communication device may communicate data signals with a lead vehicle of the vehicle system and/or the same or different data signals with other vehicles of the vehicle system. The communication device of the vehicle monitoring device may be the same or similar to other communication devices described herein.

In one or more embodiments, the one or more processors of the onboard controller, the off-board controller, and/or the vehicle monitoring device may generate and/or communication electronic command messages to control operations of the propulsion and brake systems of the vehicle system, to control operations of other vehicles operably coupled with the vehicle system, to control operations of other vehicles mechanically separated from the vehicle system, or the like.

The vehicle system and/or the EOV system may include one or more sensors (not shown), that can detect characteristics of the vehicle system, the vehicle, the monitoring device, and/or the route. For example, the sensors may detect characteristics of the vehicle system such as, but not limited to, if the vehicle system is stationary or moving, operating parameters of the moving vehicle system (e.g., speed, direction, or the like), a geographic location of the vehicle system, or the like. The sensors may detect characteristics of the EOV system such as, but not limited to, a location of the EOV system, a health score or index of the system, or the like. The sensors may detect characteristics of the route such as, but not limited to, identifications, locations, and/or statuses of wayside devices disposed along the route, route gradients, a health status of the route (e.g., blockages, deteriorating conditions, or the like), or the like.

The EOV system includes one or more ground radials 214 electrically coupled with the communication device. The ground radials conduct the data signals from the communication device, for example data signals communicated to the vehicle communication system, the off-board communication system, or the like. In the illustrated embodiment of FIG. 2, the EOV system includes three ground radials. Each of the ground radials extends from a first end 216 operably coupled with the communication device, and a second end 218 disposed a distance away from the communication device. The second end of each of the ground radials is unterminated or unconnected, such as from another electrical device. For example, the second ends of the ground radials may be unterminated to form a ground plane of the antenna of the communication device. The three ground radials are disposed within the cavity of the housing of the EOV system and extend in different directions away from the communication device and toward the first, second, and fourth surfaces 202, 204, 208, respectively, but alternatively may extend in any alternative direction within the cavity.

The ground radials may change a characteristic of the data signals communicated by the communication device. For example, the communication device may be capable of communicating data signals a first distance away from the EOV system without the ground radials, and the communication device may be capable of communicating data signals a longer, second distance away from the EOV system with the ground radials. In one or more embodiments, the communication device may be an ultra-high frequency antenna device that communicates signals having a frequency range of about 300 megahertz and about 3 gigahertz. The communication device may be unable to communicate the data signals within the frequency range of about 300 megahertz and 3 gigahertz without the ground radials, and the ground radials may allow the communication device to communicate the data signals with the onboard controller and/or the off-board controller via the vehicle communication system and/or the off-board communication system, respectively within the ultra-high frequency range. For example, the ground radials may change a strength of the data signals, may change a distance away the data signals may be communicated, or the like.

In one or more embodiments, the ground radials may be referred to as radials, ground radials, ground conductors, or the like. The ground radials form a ground plane of the antenna of the communication device of the vehicle monitoring device. For example, the ground radials may form a conducting surface within the housing of the vehicle monitoring device that receives and/or reflects data signals wirelessly communicated with the communication device. The placement or position of the different radials may control a size, shape, and/or orientation of the ground plane. Optionally, the size, shape, and/or orientation of the ground plane may be based on the frequency range used by the antenna to communicate the data signals.

In one embodiment, the ground radials may form the ground plane of the antenna within the vehicle monitoring device while the vehicle system is in transit or moving. Optionally, the ground radials may form a ground plane of the antenna while the vehicle system is stationary. Optionally, the ground radials may form the ground plane of the antenna while the antenna is wirelessly communicating data signals between a controller outside of the vehicle monitoring device. In one or more embodiments, the ground radials may change the performance of the communication device of the vehicle monitoring device. For example, the communication device performs to a first standard threshold (e.g., signal strength, clarity, or the like) with the ground radials relative to an EOV system that is devoid ground radials.

In one or more embodiments, one or more of the ground radials may be a flexible ground radial such that a shaped of the flexible ground radial may be defined or based on a location of the flexible ground radial within the cavity of the housing. For example, the ground radial may be a flexible or malleable wire or other conductive material that may be able to bend, deform, or the like, to be positioned around other components of the EOV system (not shown). For example, the shape of the ground radials may be based on the location of the ground radial, based on other components within the cavity, based on a position where the second end of the ground radial is to be located, or the like. In one or more embodiments, an operator of the EOV system may manually flex, bend, deform, reshape, or the like, one or more of the flexible ground radials based on a performance of the communication device, based on a size of the vehicle system (e.g., a number of vehicles of the vehicle system, a distance the data signals may need to wirelessly travel between the EOV system and a lead vehicle, or the like), based on an environment in which the vehicle system moves (e.g., ambient conditions such as temperature, humidity, pressure, or the like; natural geographic conditions such as mountains, forests, valleys, or the like; environments of the route such as bridges, tunnels, buildings, or the like), or the like.

Figure 3:
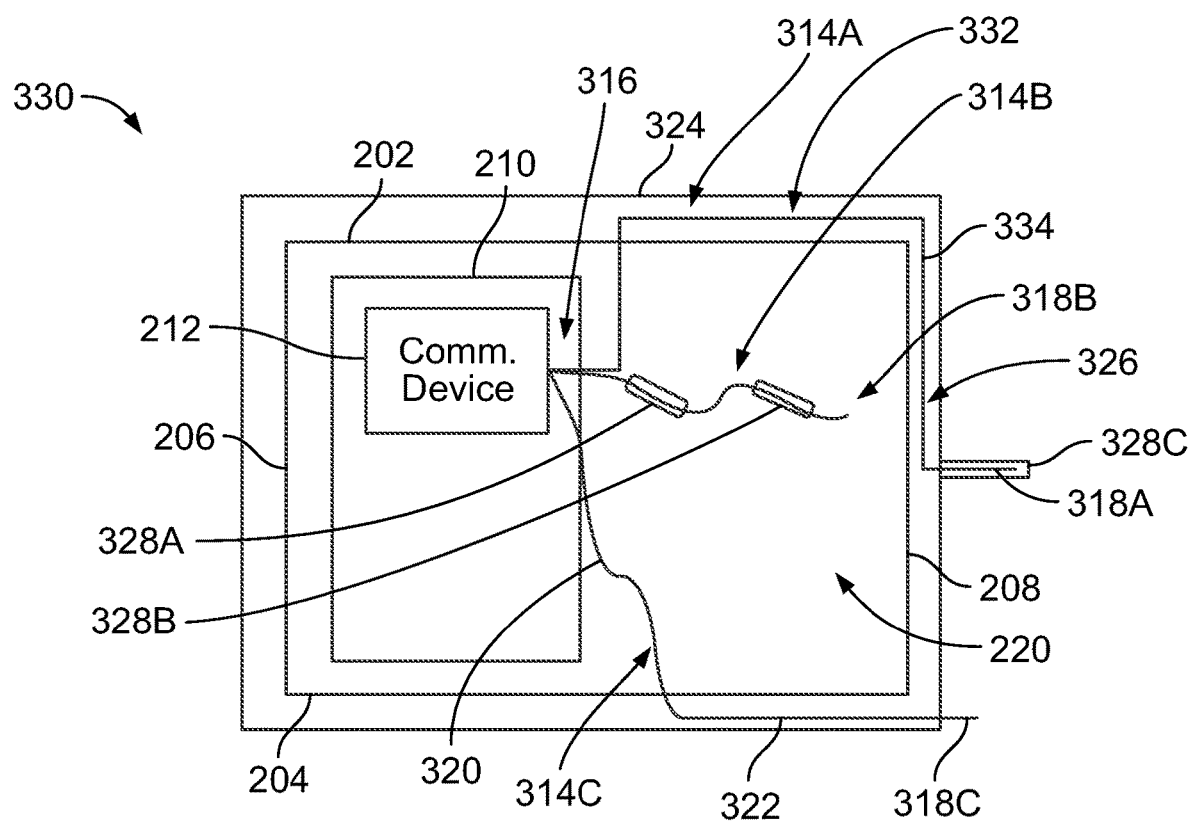
FIG. 3 illustrates a system in accordance with one embodiment.

FIG. 3 illustrates an example of a system 330 in accordance with one embodiment of the subject matter described herein. Like the system 130, the system 330 may also be referred to as an EOV system or EOV monitoring system. The system includes the vehicle monitoring device disposed within the cavity of the housing of the system formed by the plural surfaces.

The communication device of the vehicle monitoring system is operably coupled with plural ground radials 314. For example, a first end 316 of each of the ground radials 314A, 314B, 314C is operably coupled with the communication device to communication data signals between the communication device and the vehicle communication system, the off-board communication system, or the like.

In the illustrated embodiment of FIG. 3, a first ground radial 314A is a rigid ground radial such that the shape of the ground radial may remain substantially unchanged. The first ground radial extends between the first end 316 and a second end 318A. A first portion 332 of the first ground radial extends within the first surface 202 of the housing, and a second portion 334 of the first ground radial extends within the fourth surface 208 of the housing. Optionally, the first ground radial may extend within any one or more surfaces of the housing between the first and second ends of the ground radial. Additionally, the second end of the first ground radial is disposed as a position outside of the housing. In the illustrated embodiment of FIG. 3, the second end extends in a substantially horizontal direction outside of the housing, but alternatively may extend in any one or more directions, and may extend any length outside of the housing.

The EOV system includes a second ground radial 314B that extends between the first end 316 and a second end 318B. The second ground radial may be a flexible ground radial, like the ground radials shown in FIG. 2. For example, the shape or the second ground radial may be based on one or more components (not shown) that the second ground radial needs to be positioned around within the cavity of the housing.

The EOV system includes a third ground radial 314C that extends between the first end 316 and a second end 318C. The third ground radial includes a flexible portion 320 at a location between the first and second ends, and a rigid portion 322 between the first and second ends. The flexible portion of the third ground radial is disposed at a first location within the cavity of the housing, and the rigid portion of the third ground radial is disposed at a second location and extends within the second surface 204 of the housing. For example, the rigid portion of the third ground radial extends within a portion of the second surface of the housing. Like the second end of the first ground radial, the second end of the third ground radial is disposed outside of the housing. In the illustrated embodiment of FIG. 3, the second end of the third ground radial extends in a substantially horizontal direction outside of the housing, but alternatively may extend in any one or more directions, and may extend any length outside of the housing.

One or more of the ground radials may include an insulator or insulator material disposed around an exterior surface of the ground radials. In one or more embodiments, the insulators may be flexible insulators that are wrapped or otherwise disposed around the ground radials such that the insulators may flex or move relative to movement or flexing of the ground radials. In one or more embodiments, the system may include one or more sleeves 328 that may be disposed around a portion of the one or more ground radials. For example, a portion of the ground radials may extend through the sleeves. The sleeves may be disposed around the insulator of the ground radials, or may be coupled directly with an exterior surface of the ground radial. In the illustrated embodiment of FIG. 3, two sleeves 328A, 328B are disposed over two portions of the flexible second ground radial between the first and second ends of the second ground radial. Additionally, a single sleeve 328C is disposed over the second end of the first ground radial that extends outside of the housing. For example, the sleeve 328C and the second end of the first ground radial are disposed outside of the housing.

The sleeves may change a durability of the portion of the ground radial that extends within the sleeve. For example, the portion of the ground radial that extends or is disposed within the sleeve may be a flexible ground radial, and the sleeve may prohibit the shape of the portion of the flexible ground radial to be changed or deformed. Optionally, the portion of the ground radial that extends within the sleeve may be a rigid ground radial, and the sleeve may increase a rigidity or hardness of the ground radial, such as to provide additional protection to the rigid ground radial. Optionally, the system may include any number of sleeves, that may be disposed over any portion of the one or more ground radials within and/or outside of the housing. Optionally, the insulator may provide durability to the ground radials, and the sleeves may provide additional durability to the insulator and the ground radials that the insulator may be unable to provide directly. For example, the sleeves may be disposed at a location along the ground radial that may need or require reinforced protection.

In one or more embodiments of the subject matter described herein, a system includes a housing operably coupled with a vehicle system, and a vehicle monitoring system disposed within the housing comprising a wireless communication device including an antenna configured to wirelessly communication data signals. One or more ground radials are electrically coupled with the wireless communication device and conduct the data signals from the wireless communication device. The one or more ground radials form a ground plane of the antenna while the vehicle system is moving and the antenna is wirelessly communicating the data signals.

Optionally, the housing includes plural surfaces defining a cavity. The vehicle monitoring device, and the one or more ground radials may be disposed within the cavity of the housing.

Optionally, the plural surfaces of the housing may be rigid surfaces.

Optionally, the antenna of the wireless communication device may be an ultra-high frequency antenna.

Optionally, the vehicle monitoring device may wirelessly communicate with a controller outside of the housing via the wireless communication device.

Optionally, the controller may be disposed off-board the vehicle system.

Optionally, each of the one or more ground radials may extend between a first end operably coupled with the wireless communication device and a second end disposed a distance away from the wireless communication device.

Optionally, at least one of the one or more ground radials may include a rigid portion at a first location between the first and second ends, and a flexible portion at a second location between the first and second ends.

Optionally, at least a portion of at least one of the one or more ground radials may be disposed outside of the housing.

Optionally, at least a portion of at least one of the one or more ground radials may extend within a surface of the plural surfaces of the housing.

Optionally, at least one of the one or more ground radials may be disposed within two or more surfaces of plural surfaces of the housing. A first portion of the at least one ground radial may be disposed within a first surface of the plural surfaces of the housing, and a second portion of the at least one ground radial may be disposed within a second surface of the plural surfaces of the housing.

Optionally, the system may include a sleeve disposed around a portion of the one or more ground radials.

Optionally, the one or more ground radials may change a strength of the data signals.

In one or more embodiments, a system includes a housing comprising plural surfaces defining a cavity operably coupled with a vehicle system, and a vehicle monitoring device disposed within the cavity of the housing. The vehicle monitoring device includes a wireless communication device including an antenna configured to wirelessly communicate data signals with a controller disposed outside of the housing. One or more ground radials are disposed within the cavity of the housing, and each extend between a first end electrically coupled with the wireless communication device and a second end. The one or more ground radials conduct the data signals between the wireless communication device and the controller. The one or more ground radials form a ground plane of the antenna while the vehicle system is moving and the antenna is wirelessly communicating the data signals with the controller.

Optionally, at least one of the one or more ground radials may be a flexible ground radial. A shape of the flexible ground radial may be based on a location of the flexible ground radial within the cavity.

Optionally, at least one of the one or more ground radials may include a rigid portion at a first location between the first and second ends, and a flexible portion at a second location between the first and second ends.

Optionally, a portion of at least one of the one or more ground radials may be disposed outside of the housing.

Optionally, the antenna of the wireless communication device may be an ultra-high frequency antenna.

In one or more embodiments, a method includes wirelessly communicating data signals from an antenna of a wireless communication device of a vehicle monitoring device. The vehicle monitoring device is disposed within a housing operably coupled with a vehicle system. The wireless communication device wirelessly communicates data signals with a controller disposed outside of the housing. A ground plane of the antenna is formed with one or more ground radials electrically coupled with the wireless communication device. The one or more ground radials form the ground plane of the antenna while the vehicle system is moving and the antenna is wirelessly communicating the data signals.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a housing configured to be operably coupled with a vehicle system;
   a vehicle monitoring device configured to be disposed within the housing, the vehicle monitoring device comprising a wireless communication device including an antenna configured to wirelessly communicate data signals; and
   one or more ground radials configured to be electrically coupled with the wireless communication device and extending in one or more directions away from the wireless communication device, the one or more ground radials configured to conduct the data signals from the wireless communication device,
   wherein the one or more ground radials are configured to form a ground plane of the antenna while the vehicle system is moving and the antenna is wirelessly communicating the data signals.

2. The system of claim 1, wherein the housing comprises plural surfaces defining a cavity, wherein the vehicle monitoring device and the one or more ground radials are configured to be disposed within the cavity of the housing.

3. The system of claim 2, wherein the one or more ground radials includes a flexible ground radial with a shape that is based on a location of the flexible ground radial within the cavity of the housing.

4. The system of claim 2, wherein the plural surfaces of the housing include rigid surfaces.

5. The system of claim 2, wherein the antenna of the wireless communication device includes an ultra-high frequency antenna.

6. The system of claim 1, wherein the vehicle monitoring device is configured to wirelessly communicate with a controller outside of the housing via the wireless communication device.

7. The system of claim 6, wherein the controller is configured to be disposed off-board the vehicle system.

8. The system of claim 1, wherein each of the one or more ground radials is configured to extend between a first end operably coupled with the wireless communication device and a second end disposed a distance away from the wireless communication device.

9. The system of claim 8, wherein at least one of the one or more ground radials includes a rigid portion at a first location between the first and second ends, and a flexible portion at a second location between the first and second ends.

10. The system of claim 8, wherein at least a portion of at least one of the one or more ground radials is configured to be disposed outside of the housing.

11. The system of claim 8, wherein at least a portion of at least one of the one or more ground radials is configured to extend within a surface of plural surfaces of the housing.

12. The system of claim 8, wherein at least one of the one or more ground radials is configured to be disposed within two or more surfaces of plural surfaces of the housing, wherein a first portion of the at least one ground radial is configured to be disposed within a first surface of the plural surfaces of the housing, and a second portion of the at least one ground radial is configured to be disposed within a second surface of the plural surfaces of the housing.

13. The system of claim 1, further comprising a sleeve configured to be disposed around a portion of the one or more ground radials.

14. The system of claim 1, wherein the one or more ground radials are configured to change a strength of the data signals.

15. A system comprising:
    a housing configured to be operably coupled with a vehicle system, the housing comprising plural surfaces defining a cavity;
    a vehicle monitoring device configured to be disposed within the cavity of the housing, the vehicle monitoring device comprising a wireless communication device including an antenna configured to wirelessly communicate data signals with a controller disposed outside of the housing; and
    one or more ground radials configured to be disposed within the cavity of the housing, each of the one or more ground radials extending between a first end electrically coupled with the wireless communication device and a second end, the one or more ground radials extending in one or more directions away from the wireless communication device within the housing, the one or more ground radials configured to conduct the data signals between the wireless communication device and the controller,
    wherein the one or more ground radials are configured to form a ground plane of the antenna while the vehicle system is moving and the antenna is wirelessly communicating the data signals with the controller.

16. The system of claim 15, wherein the one or more ground radials include a flexible ground radial with a shape that is based on a location of the flexible ground radial within the cavity.

17. The system of claim 15, wherein at least one of the one or more ground radials includes a rigid portion at a first location between the first and second ends, and a flexible portion at a second location between the first and second ends.

18. The system of claim 15, wherein a portion of at least one of the one or more ground radials is configured to be disposed outside of the housing.

19. The system of claim 15, wherein the antenna of the wireless communication device includes an ultra-high frequency antenna.

20. A method comprising:
    wirelessly communicating data signals from an antenna of a wireless communication device of a vehicle monitoring device, the vehicle monitoring device configured to be disposed within a housing operably coupled with a vehicle system, the wireless communication device configured to wirelessly communicate the data signals with a controller disposed outside of the housing; and
    forming a ground plane of the antenna with one or more ground radials configured to be electrically coupled with the wireless communication device, the one or more ground radials extending in one or more different directions away from the wireless communication device, wherein the one or more ground radials are configured to form the ground plane of the antenna while the vehicle system is moving and the antenna is wirelessly communicating the data signals.

\* \* \* \* \*